United States Patent
Hagen et al.

(10) Patent No.: US 9,481,424 B2
(45) Date of Patent: *Nov. 1, 2016

(54) COMPACT SCROLL FAN ASSEMBLY

(71) Applicant: 3M INNOVATIVE PROPERTIES COMPANY, St. Paul, MN (US)

(72) Inventors: Ronald A. Hagen, Stillwater, MN (US); Keith K. McLaughlin, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,616

(22) Filed: Aug. 4, 2015

(65) Prior Publication Data
US 2015/0335921 A1 Nov. 26, 2015

Related U.S. Application Data

(63) Continuation of application No. 13/224,031, filed on Sep. 1, 2011, now Pat. No. 9,127,691.

(60) Provisional application No. 61/379,113, filed on Sep. 1, 2010.

(51) Int. Cl.
*A62B 7/10* (2006.01)
*B62K 11/02* (2006.01)
*A62B 18/00* (2006.01)
(Continued)

(52) U.S. Cl.
CPC .............. *B62K 11/02* (2013.01); *A62B 7/10* (2013.01); *A62B 9/04* (2013.01); *A62B 18/006* (2013.01); *A62B 18/04* (2013.01); *F04D 17/16* (2013.01); *F04D 25/068* (2013.01); *F04D 25/084* (2013.01); *F04D 29/281* (2013.01);
(Continued)

(58) Field of Classification Search
CPC .......... A62B 7/10; A62B 9/04; A62B 18/04; A62B 23/02; F04D 17/08; F04D 17/16; F04D 25/0673; F04D 25/068; F04D 25/0693; F04D 25/08; F04D 29/281; F04D 29/4226; F04D 29/701; F04D 29/703; F04D 29/02; F04D 29/023
See application file for complete search history.

(56) References Cited

U.S. PATENT DOCUMENTS 2,876,946 A 3/1959 Hornschuch
3,822,698 A 7/1974 Guy
(Continued)

FOREIGN PATENT DOCUMENTS

CN 101008405 8/2007
CN 101330243 12/2008
(Continued)

OTHER PUBLICATIONS

Freescale Semiconductor. MXP4100. Tempe, AZ: Freescale Semiconductor, 2006. Print.*

*Primary Examiner* — Devon Kramer
*Assistant Examiner* — Joseph Herrmann
(74) *Attorney, Agent, or Firm* — Kenneth B. Wood (57) ABSTRACT

A radial fan assembly for use in a powered air purifying respirator includes at least an impeller, a printed circuit board and a scroll casing. The scroll casing has a first and a second scroll casing element. The second scroll casing element includes at least a portion of the printed circuit board. When the radial fan assembly is used in a powered air purifying respirators, the respirator may also include components such as a filter assembly.

19 Claims, 4 Drawing Sheets

(51) Int. Cl.
*F04D 25/08* (2006.01)
*F04D 29/42* (2006.01)
*A62B 9/04* (2006.01)
*A62B 18/04* (2006.01)
*F04D 17/16* (2006.01)
*F04D 29/28* (2006.01)
*F04D 25/06* (2006.01)

(52) U.S. Cl.
CPC ....... *F04D29/4226* (2013.01); *F04D 25/0673* (2013.01); *F04D 25/08* (2013.01)

(56) References Cited

U.S. PATENT DOCUMENTS

| | | | |
|---|---|---|---|
| 4,885,488 A * | 12/1989 | Cox | F04D 25/0653 310/12.04 |
| 4,898,759 A | 2/1990 | Hoover et al. | |
| 4,899,740 A | 2/1990 | Napolitano | |
| 5,152,676 A | 10/1992 | Ohi | |
| 5,176,509 A * | 1/1993 | Schmider | F04D 25/0606 417/423.1 |
| 5,291,368 A | 3/1994 | Conroy-Wass | |
| 5,341,433 A | 8/1994 | Meyer | |
| 5,416,358 A | 5/1995 | Ochi | |
| 5,419,306 A * | 5/1995 | Huffman | F24J 3/003 122/26 |
| 5,648,891 A | 7/1997 | Gierut | |
| 5,719,334 A * | 2/1998 | Parsons | G01P 15/125 73/514.01 |
| 6,186,140 B1 | 2/2001 | Hoague | |
| 6,195,261 B1 * | 2/2001 | Babutzka | B60Q 1/2665 174/254 |
| 6,214,074 B1 | 4/2001 | Silviera | |
| 6,302,105 B1 | 10/2001 | Wickham et al. | |
| 6,394,768 B1 * | 5/2002 | Fukuda | H02K 5/00 310/71 |
| 6,449,164 B1 | 9/2002 | Gershfeld | |
| 6,452,298 B1 * | 9/2002 | Fukuda | H02K 5/00 310/89 |
| 6,619,933 B2 | 9/2003 | Ikeda | |
| 6,666,209 B2 * | 12/2003 | Bennett | A62B 18/006 128/200.24 |
| 6,711,024 B1 | 3/2004 | Johansson | |
| 6,737,860 B2 | 5/2004 | Hsu et al. | |
| 6,742,518 B2 * | 6/2004 | Chang | A62B 23/02 128/205.27 |
| 6,772,762 B2 | 8/2004 | Piesinger | |
| 6,844,752 B1 | 1/2005 | Cascella | |
| 6,847,521 B2 | 1/2005 | Beall et al. | |
| 6,919,782 B2 | 7/2005 | Sauder | |
| 6,973,677 B2 | 12/2005 | Diaz | |
| 7,012,346 B2 | 3/2006 | Hoffman | |
| 7,469,699 B2 | 12/2008 | Gossweiler | |
| 7,628,582 B2 | 12/2009 | Kanai et al. | |
| 7,647,927 B2 | 1/2010 | Teetzel | |
| 7,690,379 B2 | 4/2010 | Gossweiler | |
| 7,748,381 B2 | 7/2010 | Croll | |
| 8,383,462 B2 * | 2/2013 | Loiselet | H01L 23/053 257/704 |
| 9,127,691 B2 * | 9/2015 | Hagen | F04D 29/4226 |
| 2003/0139199 A1 | 7/2003 | Kinnula | |
| 2005/0103343 A1 | 5/2005 | Gosweiler | |
| 2005/0109337 A1 | 5/2005 | Diaz | |
| 2005/0252508 A1 | 11/2005 | Koerner et al. | |
| 2006/0237013 A1 | 10/2006 | Kwok | |
| 2007/0101867 A1 | 5/2007 | Hunter | |
| 2007/0194668 A1 | 8/2007 | Teshima et al. | |
| 2007/0240719 A1 | 10/2007 | Duarte | |
| 2008/0196723 A1 | 8/2008 | Tilley | |
| 2008/0315695 A1 | 12/2008 | Yamada | |
| 2009/0067583 A1 | 3/2009 | Vogt | |
| 2009/0142191 A1 * | 6/2009 | Winkler | F04D 29/284 415/224 |
| 2009/0265930 A1 | 10/2009 | Jandzio | |
| 2009/0266361 A1 * | 10/2009 | Bilger | A62B 18/006 128/204.21 |

FOREIGN PATENT DOCUMENTS

| | | |
|---|---|---|
| EP | 488574 A2 | 6/1992 |
| EP | 0 722 066 | 7/1996 |
| GB | 2 194 987 | 3/1988 |
| WO | WO 2009/067583 A2 | 5/2009 |

* cited by examiner

COMPACT SCROLL FAN ASSEMBLY

FIELD OF DISCLOSURE

The present disclosure pertains to a radial fan assembly for use in a powered air purifying respirator, where the scroll casing includes at least a portion of a printed circuit board.

BACKGROUND

Scroll fans, also known as radial or centrifugal fans, are used in a variety of devices and for a variety of purposes. Applications include, for example, climate control, vehicle and machinery cooling systems, personal comfort, ventilation, fume extraction, removing dust, and drying. Specifically, scroll fans may be used in any number of devices ranging from hair dryers and leaf blowers to cooling units for personal computers and powered air purifying respirators.

A typical scroll fan has a scroll-shaped casing and a moving component, called an impeller. The impeller often consists of a central shaft about which a set of blades or ribs are positioned. Air typically enters the fan in or near the shaft. It then moves from the shaft to the opening in the scroll-shaped fan casing as the impeller is rotated. The air is spun outwards to the outlet by deflection and centrifugal force. Scroll fans blow air out at an angle that is oblique or perpendicular to the intake of the fan. Scroll fans can produce more pressure for a given air volume than other types of fans, which can be desirable for particular applications, such as those mentioned above.

In addition to a scroll-shaped casing and an impeller, scroll fans also typically include a motor, and often control circuitry. A traditional scroll fan construction has a scroll casing, an impeller enclosed within the scroll casing, a motor to rotate the impeller, and often a small printed circuit board (PCB) mounted within the motor. The motor and PCB can then be connected via a connector ribbon or other means to a larger printed circuit board. The scroll and larger PCB are then housed within their specific device.

Space can be an important constraining factor for any scroll fan design. Powered air purifying respirators (PAPR) are no exception. PAPR's containing scroll fans can come in a variety of designs including hoods, helmets, face masks, suits, belt mounted respirators and other forms. In many of these designs, particularly where the PAPR is intended to be portable or transported by the wearer, creating an lightweight, ergonomic, and compact design is particularly important.

SUMMARY

In one aspect, the present disclosure is directed to a radial fan assembly for use in a powered air purifying respirator. The radial fan assembly includes at least an impeller, a printed circuit board, and a scroll casing. The scroll casing includes a first scroll casing element and a second scroll casing element. The second scroll casing element includes at least a portion of the printed circuit board.

In another aspect, the present disclosure is directed to a powered air purifying respirator (PAPR). The PAPR includes at least a filter assembly and a radial fan assembly. The radial fan assembly includes a scroll casing. The scroll casing includes at least a portion of a printed circuit board.

BRIEF DESCRIPTION OF THE DRAWINGS

The invention may be more completely understood in consideration of the following detailed description of various embodiments of the invention in connection with the accompanying drawings, in which.

In the following description of the illustrated embodiments, reference is made to the accompanying drawings, in which are shown by way of illustration, various embodiments in which the invention may be practiced. It is to be understood that the embodiments may be utilized, and structural changes may be made, without departing from the scope of the present invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present invention now will be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
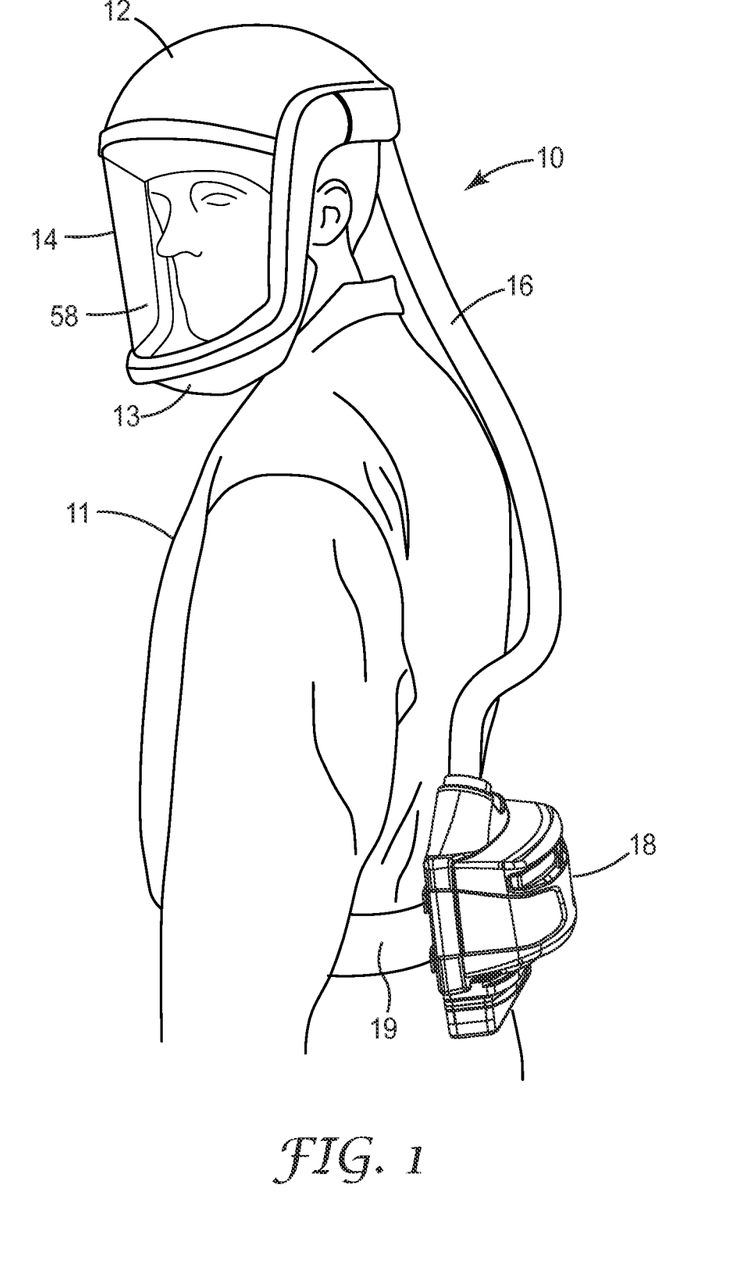
FIG. 1 shows an exemplary powered air purifying respirator.

FIG. 1 shows an exemplary powered air purifying respirator 10 (PAPR). A powered air purifying respirator is a commonly used type of respirator for working in areas where there is known to be, or there is a risk of there being, dusts, fumes or gases that are potentially harmful or hazardous to health. A PAPR has a blower assembly 18 including a fan driven by an electric motor for delivering a forced flower of air to the respirator user. A filter(s) is fitted to the blower assembly through which air is drawn by the fan. The air is passed from the blower assembly 18 through a breathing tube or hose 16 to a contained user 11 environment. Such an environment is often surrounded by a face shield 14 (as illustrated in FIG. 1), head piece, or suit. In the illustrated embodiment, the face shield also includes a protective helmet 12. The hose 16 thus provides filtered air to the user's breathing zone 58.

Face shield 14 can be relatively transparent to allow a wearer good visibility and may be made of polycarbonate materials or any other suitable material. Protective helmet 12 can further include a sealing member or face seal 13 that makes contact with a user's face to provide a barrier between the filtered air within the breathing zone 58 of the user and the outside environment. Face shield 14 may be molded as a single unit or may include multiple components later attached to each other, or may be constructed by any other appropriate method.

In the illustrated configuration, blower assembly 18 is mounted to a belt 19 and is worn by a user 11 around the waist. Alternatively, a blower assembly can be mounted to a backpack or any other device that allows a user to wear or carry blower assembly 18. A hose 16 is used to direct air flow from the blower assembly 18 to the user's breathing zone 58 as contained by face shield 14 and helmet 12 in the illustrated embodiment.

While one particular construction for a PAPR is described above, any variety or configuration of PAPR can be used in accordance with the present disclosure. For example, in one configuration, the filter and blower assembly may be mounted directly into a protective helmet or into a facepiece (also known as a breath assisted PAPR).

Figure 2:
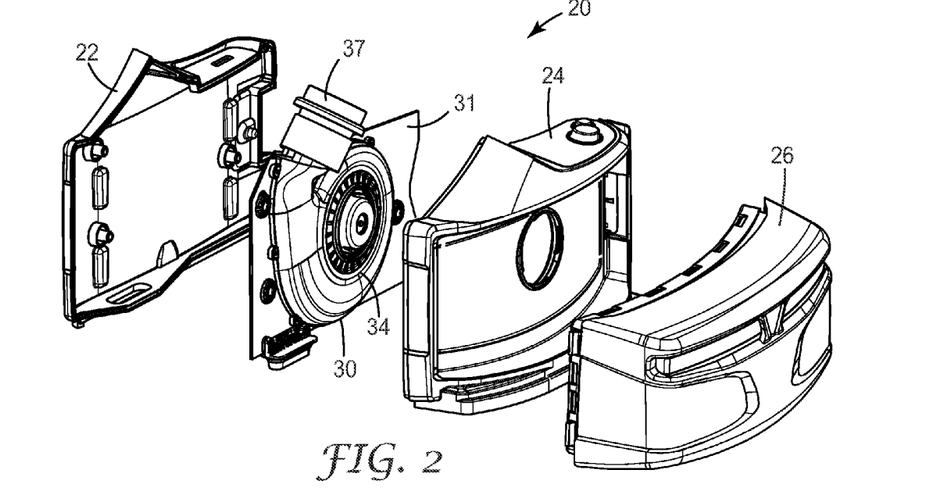
FIG. 2 shows an exploded view of a blower assembly with a compact scroll fan assembly for use in a powered air purifying respirator.

FIG. 2 shows an exploded view of a blower assembly 20 with a compact radial or scroll fan assembly 30 for use in a powered air purifying respirator. Because many PAPR's are worn or transported by a user as described above, size, weight, and shape of the blower assembly are important factors, and can contribute to the comfort and mobility of the user. The fan is an important component within a PAPR. In addition to motor efficiency and speed, factors like impeller diameter, blade design and scroll casing seal can impact the air pressure and volume provided to the user.

FIG. 2 shows an example of a compact radial fan assembly 30 that is capable of reducing overall space required for fan assembly 30 within blower assembly 20 while maintaining air volume and pressure levels. Blower back casing 22 provides an outer structure for blower assembly 20. Back casing 22 can include clips, slots that a strap can be laced through, interlocking devices, or one or more other features for attaching blower assembly 20 to a belt, harness, back pack or other item that can be worn or transported by a user. In the illustrated embodiment, fan assembly 30 fits adjacent to blower back casing 22. Fan assembly 30 includes a first scroll casing element 34 and a printed circuit board (PCB) 31, which serves as a second scroll casing element in this embodiment. First scroll casing element 34 can be any portion of a scroll casing that serves to direct or contain airflow through a scroll fan. First scroll casing element 34 can have any workable shape, including but not limited to, a cylindrical shape or a bowl-like shape. First scroll casing element 34 can be molded, cast, pressed or formed by any other appropriate manufacturing method.

Second scroll casing element also can be any portion of a scroll casing that serves to direct or contain airflow through a scroll fan. While PCB 31 serves as second scroll casing element in the illustrated embodiment, PCB 31 may be only a part of second scroll casing element. For example, additional components made of any appropriate material may be secured to PCB 31 to form second scroll casing element when combined.

First scroll casing element 34 is mounted to PCB 31 to form a path for air drawn through filter component 26, rotated about the scroll, and provided to the user. Printed circuit board 31 may use organic or inorganic base materials in a single or multilayer, rigid or flexible form. Blower front casing 24, the portion of the blower casing facing away from a wearer's body, fits over fan assembly 30 and connects to blower back casing 22. A filter component 26 fits into the front of blower front casing 24. Filter component 26 can be attached to blower front casing 24 by a variety of methods, for example, by using clips, screws, snaps, sliding filter component 26 into a slot, or by any other method known in the art. This construction allows fan assembly to draw ambient air through filter component 26, into an impeller 36 and around the scroll casing (as illustrated in later figures), and force air to a user's breathing zone via outlet 37.

Filter component 26 can include any one or more of a variety of materials and can target a variety of substances. For example, filter component 26 can include a traditional filter bed, a pleated medium, or any other type of filtering medium or combination of media. The filter medium can include a particulate filtering medium, a chemical filtering medium, or any combination of the two. A chemical filtering medium may include one or more of a sorbent, a catalyst or a chemically reactive medium and may target gases such as ammonia, methylamine, formaldehyde, chlorine, hydrogen chloride, sulfur dioxide, acidic gases, organic vapors or any other desired gas or contaminant. In one embodiment, filter component 26 can be curved to provide a more compact or ergonomic construction.

Blower assembly 20 can be configured in a variety of different ways. Fan assembly 30 is preferably disposed downstream of filter component 26 to prevent fan assembly 30 from collecting contaminants from the ambient air. However, in an alternative embodiment, filter component 26 could be located downstream of fan assembly 30. In another alternative embodiment, blower casing could be designed as a single component, instead of including blower back casing 22 and blower front casing 24. Blower casing could also have more than two components, or include only two components arranged in a different configuration than that illustrated. Blower assembly 20 also can be configured to fit inside or be mounted to a helmet or facepiece, or to be used with any other type of PAPR.

Figure 3:
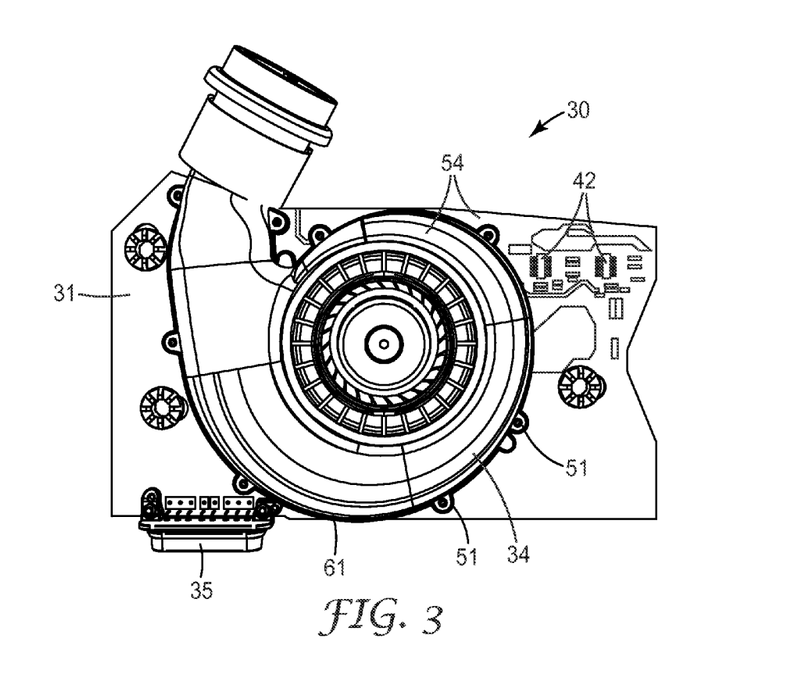
FIG. 3 shows a top view of a compact scroll fan assembly.

FIG. 3 shows a top view of a compact fan scroll assembly 30. First scroll casing element 34 is mounted to printed circuit board 31 using screws 51 to form scroll fan casing 54. Alternatively, any other mounting method or device, such as clips, clamps, snaps, pins or any other method known in the art can be used to secure first scroll casing element 34 to printed circuit board 31. Gasket 61 or another sealing element can be disposed between PCB 31 and the edge of first scroll casing element 34 to provide an air-tight or near air-tight seal between PCB 31 and first scroll casing element 34. Gasket 61 can be made of any appropriate material including an elastomeric material such as a type of foam or rubber. In the illustrated embodiment, PCB 31 also has other components mounted to it, including battery connector 35 and other discrete electrical components 42 such as transistors, a microcontroller, diodes, resisters, and other components used in the control circuitry for blower assembly 20 and even other parts of a PAPR.

Figure 4:
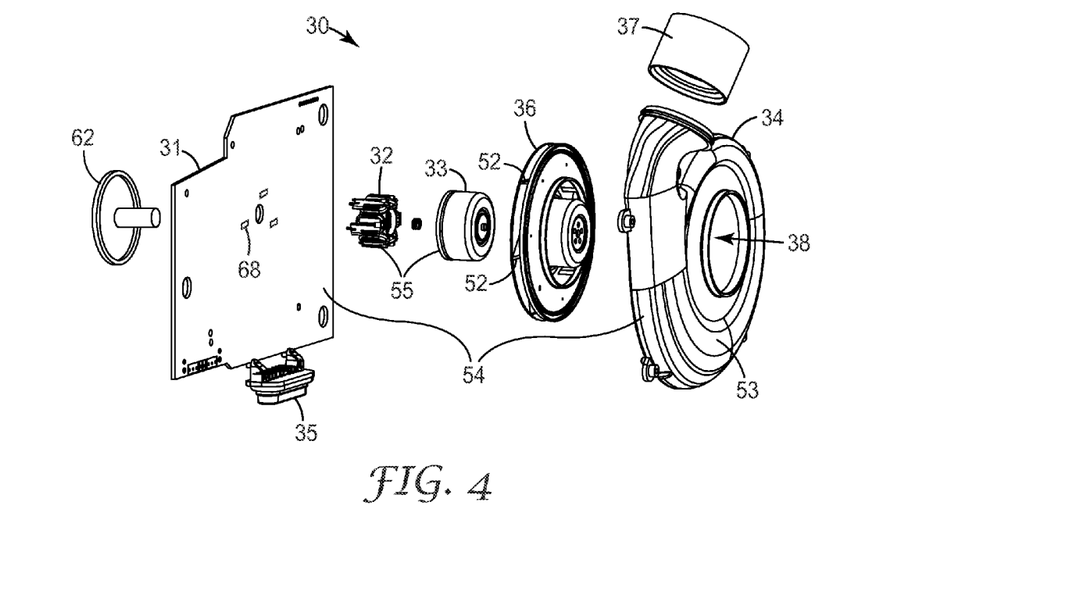
FIG. 4 shows an exploded view of a compact scroll fan assembly.

FIG. 4 shows an exploded view of a compact scroll fan assembly 30. PCB 31 serves as a scroll casing component such that it is a portion of the scroll casing and directs or contains airflow within a fan scroll. PCB 31 also serves as a mounting surface for motor 55. Motor 55 includes at least stator 32, rotor assembly 33, bearing tower 62, and hall effect sensors 68. Stator 32 can be soldered or otherwise secured to PCB 31. Bearing tower 62 can be attached or secured to the side of PCB 31 opposite the side stator 32 was secured to. Bearing tower 62 can be attached to PCB 31 using screws or any other fastening method known in the art. Rotor 33 can be mounted over stator 32. Hall effect sensors 68 can be secured on PCB 31 by a method such as soldering and serve to sense the position of the rotor 33. This information can be fed back to a motor controller (not shown) to allow for more precise motor control.

One advantage of mounting both motor 55 and first scroll fan casing element 34 to PCB 31 is the availability of a single, larger sized PCB 31 for meeting design and safety requirements for intrinsically safe applications. Traditional motor designs have a smaller PCB mounted inside motor 55, and a connector is used to connect motor 55 to its corresponding drive and safety components, which are typically mounted on a second PCB. Mounting motor 55 to a larger PCB 31 allows drive electronics and safety components for the motor to be directly mounted to the same PCB 31. Examples of safety components include diodes used to prevent motor voltage from exceeding maximum levels. These components can then be connected to motor 55 using traces in the PCB instead of requiring additional connector components or ribbons. This is turn can reduce the likelihood of connection failure or sparking, and enable the design to meet safety requirements for certification for use in hazardous locations.

Impeller 36 is mounted to rotor assembly 33. In one embodiment, impeller 36 can be mounted to rotor assembly 33 using friction. Alternatively, impeller 36 can be molded directly over rotor assembly 33, secured to rotor assembly 33 using adhesive, or secured by any other appropriate method. First scroll casing element 34 is finally mounted to PCB 31, and together with PCB 31, forms scroll casing 54 for scroll fan assembly 30. As illustrated, only a portion of PCB 31 forms part of scroll casing 54 in this embodiment. In alternate embodiments, a larger or smaller surface area of PCB 31 could be used as part of scroll casing 54. Alternatively, more than two components could be used to form scroll casing 54.

Stator 32, rotor assembly 33, bearing tower 62 and hall effect sensors 68 combine to form an electric motor 55 which rotates impeller 36. As impeller 36 rotates, it draws ambient air through inlet 38. Blades 52 of impeller 36 force air around the curve of air passageway 53 of scroll casing 54 formed by both first scroll casing element 34 and PCB 31. Outlet piece 37 attaches to scroll casing 54. Outlet piece 37 can connect hose 16 (shown in FIG. 1) to scroll casing 34 to ensure airflow between scroll fan assembly 30 and a user's breathing zone 58 (shown in FIG. 1).

Electric motor 55 can be any type of motor appropriate for use with a scroll fan. For example, it may be a direct current (DC) motor, such as a brushless or brushed DC motor. An alternating current (AC) motor can also be used, such as an AC induction or AC synchronous motor. When batteries are used to power a PAPR, use of a DC motor may be more advantageous than an AC motor because use of an AC motor requires the additional use of a power inverter to convert DC power into a usable form for the AC motor.

When batteries are used to provide power to a blower assembly 20 in a PAPR 10, a variety of batteries, including lithium ion, nickel metal hydride, or nickel cadmium can be used. Batteries can be connected to PAPR 10 in any desired way. For example, batteries could be housed within blower assembly 20, exteriorly attached to blower assembly 20, attached via a cable to blower center 20, or by any other means. In one embodiment, battery connector assembly 35 can be designed to provide an air-tight seal to batteries to prevent contamination of connector pins by dust or other potentially harmful contaminants.

In the illustrated embodiments, impeller 36 has backward inclined blades 52, but impeller 36 may have any appropriate blade design, for example, forward curved blades, flat blades, or any other workable design. Impeller 36 can be manufactured in several different pieces that are later secured to each other, or the entire impeller 36 can be a unitary construction. For example, a base and blades of the impeller 36 may be molded as a single component and later secured to an annular construction, such as a ring, to form impeller 36. Impeller 36 can be molded or made by any other appropriate method.

Figure 5:
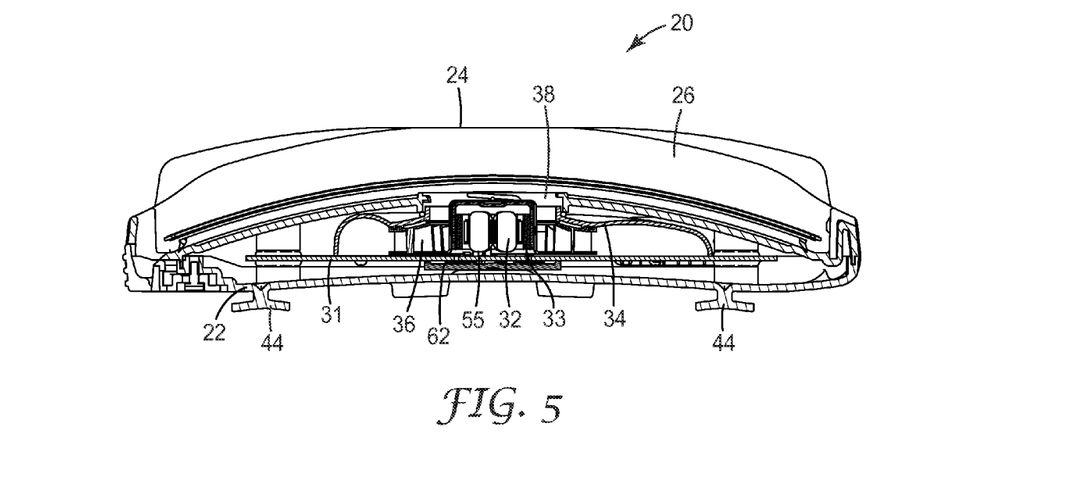
FIG. 5 shows a cut-away view of a blower assembly.

FIG. 5 shows a cut-away view of blower assembly 20. In this illustrated embodiment, blower back casing 22 forms the portion of blower casing nearest the wearer. T-shaped clips 44 protrude from blower back casing 22 and can be used to secure the blower assembly 20 to a belt or other type of strap, carrier or garment. In this instance, the surface of blower back casing 22 is slightly curved to conform to a wearer's waist. PCB 31 may be located adjacent to blower back casing 22. While PCB 31 is rigid in this particular embodiment, PCB 31 could alternatively be flexible to conform more to the shape of blower back casing 22 or any other piece of blower casing. A flexible PCB includes a printed circuit produced on a flexible substrate, allowing it to be folded or bent. A flexible PCB may enable circuitry to better fit into the available space or to allow better movement.

Motor 55, including bearing tower 62, stator 32 and rotor 33, is mounted to PCB 31. Impeller 36 is rotated by motor 55. First scroll casing element 34 is secured to PCB 31, and in this instance, covers the impeller 36 and motor 55, while providing an opening for inlet 38. Blower front casing 24 covers the impeller and, in this instance, connects to blower back casing 22 to encase scroll fan assembly 30. As mentioned above, any type of blower casing known in the art can be used consistent with the present disclosure. Filter component 26 is mounted to the top (as illustrated) or outer-facing surface of front blower casing 22. As mentioned above, filter component 26 can be secured to blower casing or within blower casing using any attachment method, such as clips, screws, snaps, sliding filter component 26 into a slot, or by any other method known in the art. Filter component 26 can be alternatively disposed downstream of scroll fan assembly 30, or in any other desired location on the PAPR.

Figure 6:
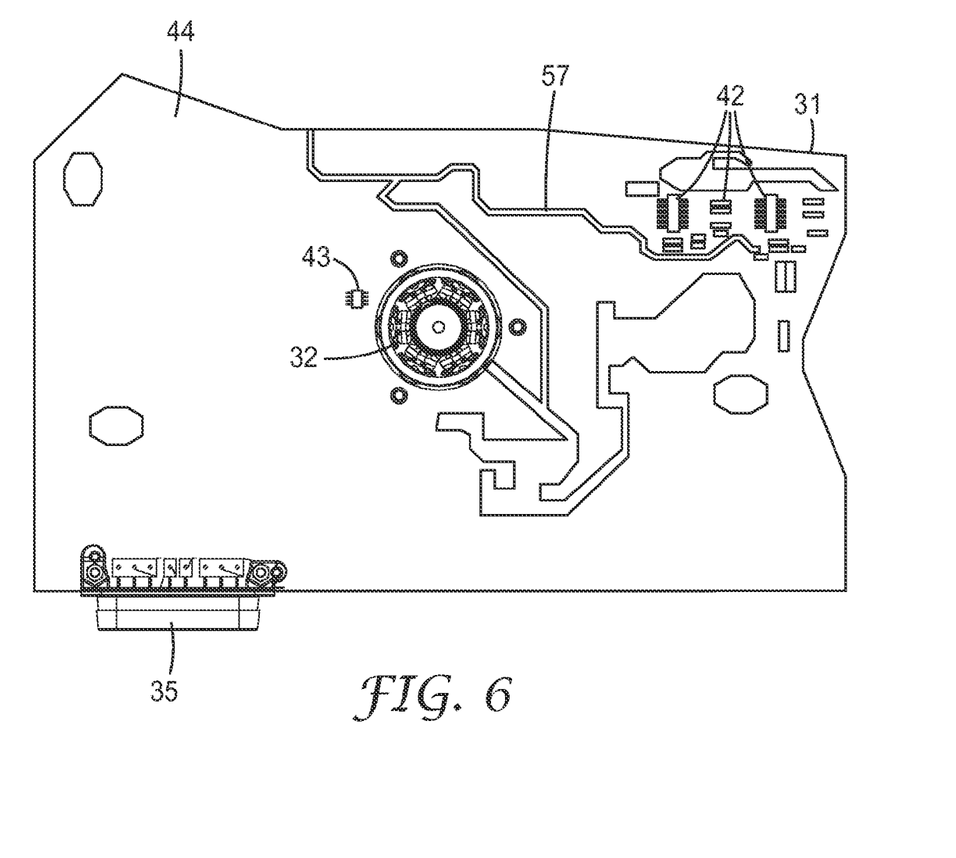
FIG. 6 shows a top view of an exemplary printed circuit board consistent with the present disclosure.

FIG. 6 shows a top view of a printed circuit board 31 consistent with the present disclosure. In the present instance, stator 32, battery connector assembly 35 and other electrical components 42 are mounted to PCB 31. Additionally, a sensor 43 can be mounted to PCB 31. In one embodiment, sensor 43 is in an air flow path of the scroll fan assembly 30.

Any type of PCB 31 known in the art can be used, consistent with the present disclosure. A PCB is generally used to mechanically support and electrically connect electronic components using conductive pathways or traces 57. PCB's and their traces can be made in a variety of ways. For example, the traces 57 can be etched from copper sheets laminated onto a non-conductive substrate. A substrate can be made out of a variety of materials. For example, it may be made of multiple layers of dielectric laminated together with epoxy resin pre-impregnated fibers. One commonly used dielectric is polytetrafluoroethylene. Pre-impregnated fibers may be, for example, phenolic cotton paper, cotton paper and epoxy, woven glass and epoxy, matte glass and polyester, etc. After the layers of epoxy are laminated together, they can be coated with a conducting layer made of, for example, a thin copper foil.

Traces 57 can be created by several different methods. For example, using a silk screen method, unwanted copper can be removed after applying a temporary mask, thus leaving only the desired copper traces. Such a mask over desired copper traces can be created by using silk screen printing to apply etch resistant inks to protect the copper foil. Subsequent etching can then remove the unwanted ink. A photo-engraving method uses a photomask and chemical etching to remove the copper foil from the substrate. A photomask can be prepared with a photoplotter using data provided by a technician using computer-aided manufacturing software. PCB milling uses a two or three-axis mechanical milling system to mill away copper foil from the substrate. Milling can be especially useful for smaller quantities or prototype quantities. Traces 57 can also be created by additive processes where a reverse mask is applied over the copper or conductive layer on the PCB so that only the desired traces show through. Additional copper or conductive material can then be plated onto the board in the unmasked areas.

PCB 31 can have traces on both of its major surfaces. Vias, holes drilled through a PCB, are often filled with annular rings of conductive material to allow thermal and electrical connection of conductors or traces on opposite sides of a PCB. Additionally, some PCB's, known as multi-layer PCB's have trace layers inside the PCB. These can be formed by bonding together separately etched thin boards.

Traces 57 on PCB 31 can be coated with materials such as photo resist to prevent the etching away of exposed copper. Areas that should not be soldered or contain no traces can be covered with a solder mask coating. Such a coating can prevent solder from bridging between conductors and creating short circuits.

Other coatings can be applied to PCB 31. For example, a conformal coating such as an epoxy resin or silicone can be applied to the entire surface of a PCB or just a portion of a surface of the PCB. For example, the portion of PCB 31 nearest the first scroll casing element can be sealed with a conformal coating. One exemplary coating is 3M™ Novec™ coating fluid, manufactured by 3M Company of St. Paul, Minn. Coatings can serve to seal any exposed traces or vias on a surface of the PCB and provide protection to the surface of a PCB in addition to protecting any components mounted to the surface of the PCB. In some embodiments, such a coating on a side of the PCB nearest the first scroll element can serve as a fluidic barrier. This can increase efficiency of the fan, and in turn, the PAPR.

Sensor 43 can be mounted to any appropriate location on PCB 31, on the same surface of PCB 31 that first scroll casing element 34 is mounted too. Additionally, sensor 43 may be mounted to the opposite side of PCB 31 or may be mounted to an area in the air path of the scroll fan, such that it is disposed in an interior of the scroll casing. Sensor 43 can monitor parameters such as temperature, air pressure, motor position, motor speed, or any other desired parameter. Examples of sensors that could be used consistent with the present disclosure include the MPL115A Digital Barometer distributed by Freescale™ of Austin, Tex., or an ASDX Series Pressure Sensor distributed by Honeywell, Inc. of Morristown, N.J., or any other appropriate sensor.

Other electrical components 42, passive or active, can be mounted at any desired location on PCB 31. For example, a microprocessor, resistor, capacitor, transistor, diode, relay, wireless transceiver or any other or combination of such components may be used consistent with the present disclosure. Components 42 can be mounted in an interior of the scroll casing, on an exterior of the scroll casing, or on a side of PCB 31 opposite first scroll casing element.

Electronics 42 can be control electronics for any portion of the PAPR, or for the entire PAPR. Control electronics 42 can be used for example, to govern the rate of airflow of the PAPR, calculate remaining battery life, monitor filter loading and any other desired parameter.

Connector 35, such as a separate component or one or more conductors, can be used to connect PCB 31 and any components on it to a power source. As discussed above, in one embodiment, a power source can be a battery. Alternatively, it may be a form of AC power. A power source for PCB 31 can be disposed in any desired manner. For example, it may be mounted to PCB 31, electrically to PCB 31 and mounted elsewhere, or unmounted.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

This application is a continuation of U.S. patent application Ser. No. 13/224,031, filed Sep. 1, 2011, which claimed the benefit of U.S. Provisional Patent Application No. 61/379,113, filed Sep. 1, 2010, the disclosures of both of which are incorporated by reference in their entirety.

What is claimed is:

1. A powered air purifying respirator comprising:
   a blower assembly comprising:
      an outer casing comprising a back casing connected to a front casing;
      a filter assembly comprising a filter component chosen from the group consisting of a particulate filtering medium, a chemical filtering medium, and combinations thereof;
      and,
      a radial fan assembly that is disposed downstream of the filter assembly and that resides in a space between the back casing and the front casing, the radial fan assembly including at least an impeller and a scroll casing with an air inlet and an air outlet, the scroll casing being configured to receive air that is drawn through the filter component of the filter assembly and to direct the air outward through the air outlet of the scroll casing;
         wherein the scroll casing is comprised of a first scroll casing element and a second scroll casing element, wherein a printed circuit board serves as the second scroll casing element, and wherein the first scroll casing element is mounted to a first surface of the printed circuit board so that the printed circuit board and the first scroll casing element combine to form a path for flow of air that is drawn through the filter assembly,
         and wherein the radial fan assembly further comprises a motor to rotate the impeller, the motor and impeller being located within the scroll casing and the motor being mounted on the first surface of the printed circuit board,
         and the scroll casing further comprises a sealing element that is disposed between the first surface of the printed circuit board and an edge of the first scroll casing element for providing an air-tight seal between the printed circuit board and the first scroll casing element.

2. The powered air purifying respirator of claim 1 wherein the filter assembly resides outside the space between the back casing and the front casing in which the radial fan assembly resides.

3. The powered air purifying respirator of claim 1, wherein the printed circuit board is a fluidic barrier.

4. The powered air purifying respirator of claim 1, wherein the printed circuit board is flexible.

5. The powered air purifying respirator of claim 1, wherein the printed circuit board is rigid.

6. The powered air purifying respirator of claim 1, wherein at least a portion of the first surface of the printed circuit board is sealed with a conformal coating.

7. The powered air purifying respirator of claim 1, further comprising a discrete electrical component that is mounted to the first surface of the printed circuit board.

8. The powered air purifying respirator of claim 1, further comprising a pressure sensor, wherein the pressure sensor is mounted to a second surface that is opposite from the first surface of the printed circuit board that the first scroll casing element is mounted to.

9. The powered air purifying respirator of claim 1, further comprising control electronics for the powered air purifying respirator, wherein the control electronics are mounted on the printed circuit board.

10. The powered air purifying respirator of claim 9, wherein the control electronics comprise a microprocessor, and wherein the microprocessor is mounted on the printed circuit board.

11. The powered air purifying respirator of claim 1, wherein the printed circuit board comprises a major plane that is oriented substantially normal to an axis of rotation of the impeller of the radial fan assembly.

12. The powered air purifying respirator of claim 1 wherein the printed circuit board that serves as the second scroll casing element is the only printed circuit board comprised by the radial fan assembly.

13. The powered air purifying respirator of claim 1 wherein the first scroll casing element defines the entirety of the air inlet and the entirety of the air outlet of the scroll casing, and wherein the printed circuit board does not define any portion of the air inlet or of the air outlet.

14. The powered air purifying respirator of claim 1, wherein the first scroll casing element is a spiral-shaped casing element.

15. The powered air purifying respirator of claim 1, wherein the powered air purifying respirator further comprises a breathing hose through which filtered air that exits the air outlet of the blower assembly is provided to a breathing zone of a user of the powered air purifying respirator.

16. The powered air purifying respirator of claim 15, wherein the blower assembly is mounted to a belt that is configured to be worn around the waist of a user of the powered air purifying respirator.

17. The powered air purifying respirator of claim 1, wherein the first scroll casing element is a molded element.

18. The powered air purifying respirator of claim 1, wherein the motor of the radial fan assembly is a battery-powered brushless DC electric motor.

19. The powered air purifying respirator of claim 1, wherein the sealing element comprises an elastomeric material.

* * * * *